(12) United States Patent
Michibata (10) Patent No.: US 8,755,082 B2
(45) Date of Patent: Jun. 17, 2014

(54) IMAGE FORMING APPARATUS

(75) Inventor: Takumi Michibata, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 252 days.

(21) Appl. No.: 13/294,366

(22) Filed: Nov. 11, 2011

(65) Prior Publication Data

US 2012/0120423 A1 May 17, 2012

(30) Foreign Application Priority Data

Nov. 15, 2010 (JP) ................................. 2010-254732

(51) Int. Cl.
*H04N 1/60* (2006.01)

(52) U.S. Cl.
USPC ............................................ 358/1.9; 399/49

(58) Field of Classification Search
USPC .......... 358/1.1, 1.2, 1.4, 1.5, 1.14, 1.18, 3.24, 358/3.26, 518, 521; 399/39, 49, 299, 399/301–303
See application file for complete search history.

(56) References Cited

U.S. PATENT DOCUMENTS

| 8,009,999 B2 * | 8/2011 | Takane .......................... 399/301 |
| 2002/0136570 A1 * | 9/2002 | Yamanaka et al. ............ 399/301 |
| 2005/0031361 A1 * | 2/2005 | Kobayashi ...................... 399/49 |
| 2008/0240798 A1 * | 10/2008 | Murayama ..................... 399/301 |
| 2010/0061740 A1 * | 3/2010 | Murayama ...................... 399/15 |
| 2010/0074658 A1 * | 3/2010 | Hayakawa ..................... 399/301 |
| 2010/0226677 A1 * | 9/2010 | Matsuo ............................ 399/66 |
| 2010/0247124 A1 * | 9/2010 | Aoki et al. ....................... 399/49 |
| 2011/0097112 A1 * | 4/2011 | Kim et al. ...................... 399/299 |
| 2012/0148315 A1 * | 6/2012 | Nakashima .................... 399/301 |
| 2013/0189000 A1 * | 7/2013 | Cho ............................... 399/301 |

FOREIGN PATENT DOCUMENTS

| JP | 11-065208 A | 3/1999 |
| JP | 2001228679 A * | 8/2001 |

* cited by examiner

*Primary Examiner* — Kimberly A Williams
(74) *Attorney, Agent, or Firm* — Buchanan Ingersoll & Rooney PC (57) ABSTRACT

An image forming apparatus including a plurality of photoreceptors; a plurality of developing devices for forming toner patterns on the plurality of photoreceptors; an intermediate transfer medium for receiving the toner patterns transferred from the plurality of photoreceptors; a controller for controlling the plurality of developing devices to form first toner patterns that are lines extending in a main-scanning direction and second toner patterns that are lines slanting from the main-scanning direction on the plurality of photoreceptors such that the first toner pattern and the second toner pattern transferred from the same photoreceptor will be arranged on the intermediate transfer medium at an interval in a sub-scanning direction of a circumferential length of the photoreceptor from which the first toner pattern and the second tone pattern are transferred; and a sensor for detecting the toner patterns transferred onto the intermediate transfer medium.

7 Claims, 5 Drawing Sheets

IMAGE FORMING APPARATUS

This application is based on Japanese Patent Application No. 2010-254732 filed on Nov. 15, 2010, the content of which is incorporated herein by reference.

BACKGROUND OF THE INVENTION

1. Field of the Invention

The present invention relates to an image forming apparatus, and more particularly to an image forming apparatus comprising a plurality of developing devices and a plurality of photoreceptors.

2. Description of Related Art

A color image forming apparatus forms a color image by forming a yellow (Y) toner image, a magenta (M) toner image, a cyan (C) toner image and a black (K) toner image on a plurality of photosensitive drums respectively and by combining the Y, M, C and K toner images on an intermediate transfer belt.

In such an image forming apparatus, in order to prevent non-coincidence of Y, M C and K toner images in a main-scanning direction, image stabilization control is performed. In the image stabilization control, test patterns, each composed of a horizontal line (a line extending in the main-scanning direction) and a diagonal line, are formed, and positional errors in the main-scanning direction are detected based on the gaps between the horizontal lines and the diagonal lines of the respective test patterns. Then, in accordance with the detected positional errors, the image forming apparatus makes corrections to the image forming positions of Y, M, C and K toner images.

Figure 6:
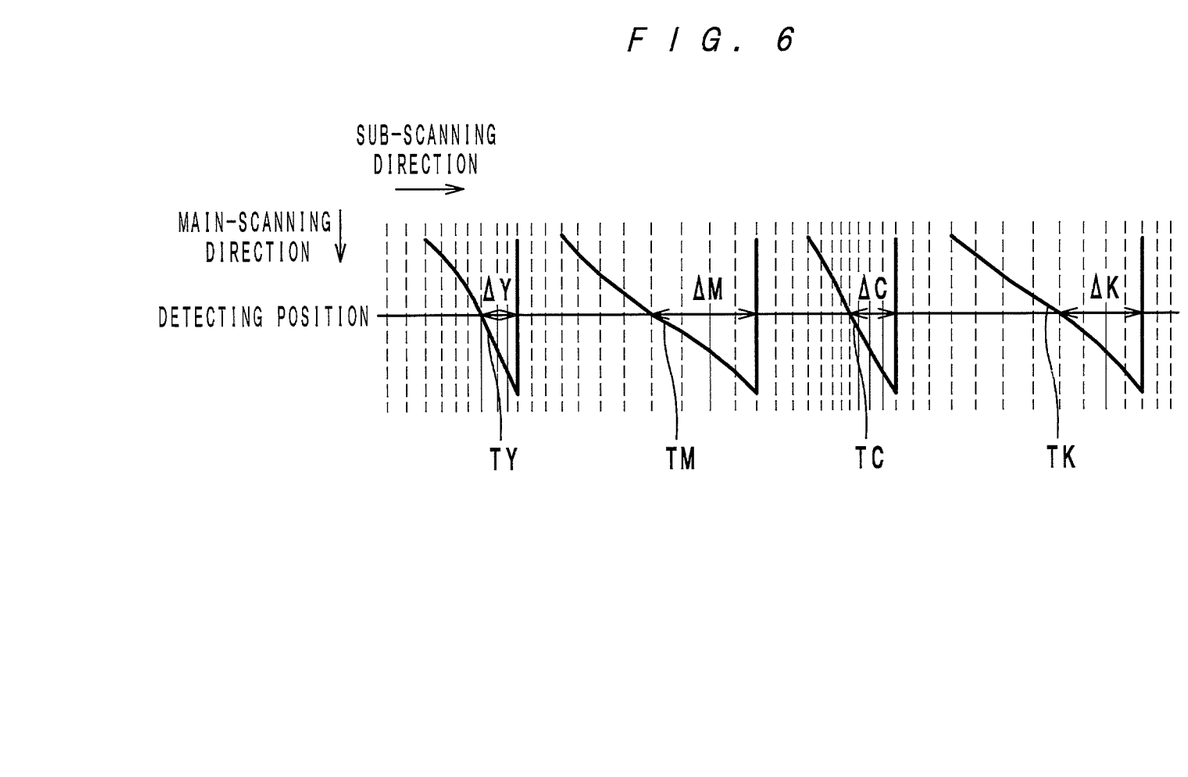
FIG. 6 is a chart of toner patterns formed on an intermediate transfer belt in image stabilization control performed in a conventional image forming apparatus.

However, this image stabilization control is not enough to prevent non-coincidence of colors. FIG. 6 shows the test patterns formed on the intermediate transfer belt in the image stabilization control.

Generally, photosensitive drums actually do not rotate at a constant speed because the gears for rotation of the photosensitive drums have production errors. Accordingly, as shown by FIG. 6, even if Y, M C and K test patterns, each composed of a horizontal line and a diagonal line, coincide with one another in the main-scanning direction, the gaps ΔY, ΔM, ΔC and ΔK between the horizontal lines and the diagonal lines in the Y, M, C and K test patterns depend on in what parts of the respective photosensitive drums with respect to the sub-scanning direction the Y, M, C and K test patterns were formed. This prevents accurate detection of positional errors of the Y, M, C and K test patterns in the main-scanning direction. Thus, with the image stabilization control described above, it is impossible to fully prevent color registration errors.

In order to improve the detection accuracy of positional errors of test patterns despite the eccentricity and the inconstant-speed rotation of the photosensitive drums, for example, Japanese Patent Laid-Open Publication No. 11-65208 suggests a color image forming apparatus that forms a plurality of toner marks and that calculates a median error. Thus, some inventions have been made to minimize the effects of the inconstant-speed rotation of the photosensitive drums on the detection of positional errors in the main-scanning direction of test patterns.

SUMMARY OF THE INVENTION

An object of the present invention is to provide an image forming apparatus wherein the accuracy of detection of registration errors in the main-scanning direction is improved.

An image forming apparatus according to an embodiment of the present invention comprises: a plurality of photoreceptors; a plurality of developing devices for forming toner patterns on the plurality of photoreceptors; an intermediate transfer medium for receiving the toner patterns transferred from the plurality of photoreceptors; a controller for controlling the plurality of developing devices to form first toner patterns that are lines extending in a main-scanning direction and second toner patterns that are lines slanting from the main-scanning direction on the plurality of photoreceptors such that the first toner pattern and the second toner pattern transferred from the same photoreceptor will be arranged on the intermediate transfer medium at an interval in a sub-scanning direction of a circumferential length of the photoreceptor from which the first toner pattern and the second toner pattern are transferred; and a sensor for detecting the first toner patterns and the second toner patterns transferred onto the intermediate transfer medium.

BRIEF DESCRIPTION OF THE DRAWINGS

This and other objects and features of the present invention will be apparent from the following description with reference to the accompanying drawings in which.

DETAILED DESCRIPTION OF THE PREFERRED EMBODIMENTS

General Structure of the Image Forming Apparatus

Figure 1:
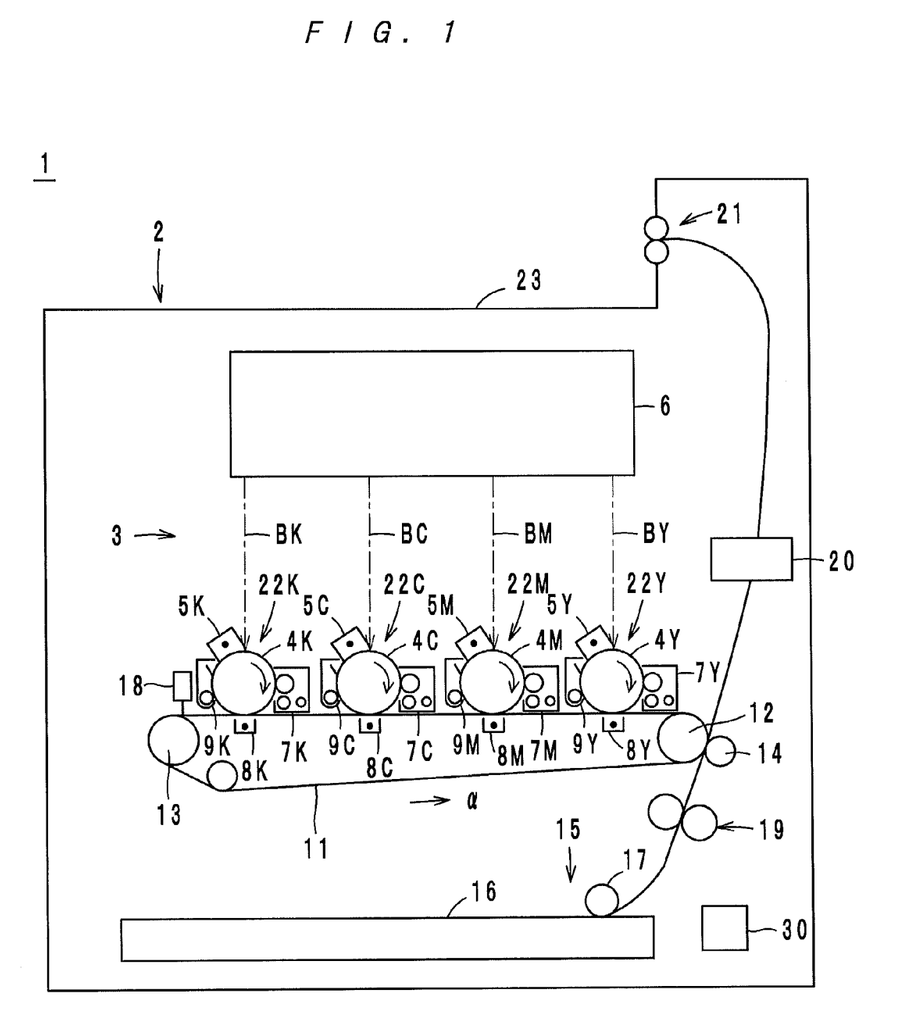
FIG. 1 is a skeleton framework of an image forming apparatus.

Referring to the drawings, an image forming apparatus according to an embodiment of the present invention is generally described. FIG. 1 shows the general structure of the image forming apparatus 1.

The image forming apparatus 1 is an electrophotographic color printer and combines images of four colors, namely, yellow (Y), magenta (M), cyan (C) and black (K) by a tandem method. The image forming apparatus 1 forms an image on a paper sheet P in accordance with image data read out by a scanner. As shown in FIG. 1, the image forming apparatus 1 comprises a body 2, a printing section 3, a cassette 15, a sensor 18, a pair of registration rollers 19, a fixing device 20, a pair of ejection rollers 21, a printed-sheet tray 21 and a control section 30.

The control section 30, which is, for example, a CPU, controls the whole apparatus 1.

The cassette 15 feeds paper sheets (print medium) P one by one, and the cassette 15 comprises a cassette body 16 and a feed roller 17. In the cassette body 16, a plurality of paper sheets P to be subjected to printing are stacked. The feed roller 17 picks up the sheets P one by one from the cassette body 16.

The pair of registration rollers 19 feeds the sheet P fed from the feed roller 17 forward at the right moment such that a toner image can be transferred onto the sheet P in the printing section 3.

The printing section 3 forms a toner image on the sheet P fed from the cassette 15. The printing section 3 comprises an optical scanning device 6, a transfer devices 8 (8Y, 8M, 8C and 8K), an intermediate transfer belt 11, a driving roller 12, a driven roller 13, a secondary transfer roller 14 and image forming units 22 (22Y, 22M, 22C and 22K). Each of the image forming units 22 (22Y, 22M, 22C and 22K) comprises a photosensitive drum 4 (4Y, 4M, 4C, 4K), a charger 5 (5Y, 5M, 5C, 5K), a developing device 7 (7Y, 7M, 7C, 7K) and a cleaner 9 (9Y, 9M, 9C, 9K).

The photosensitive drums 4 (4Y, 4M, 4C and 4K) are cylindrical and are driven to rotate clockwise in FIG. 1. The chargers 5 (5Y, 5M, 5C and 5K) charge the peripheral surfaces of the respective photosensitive drums 4 (4Y, 4M, 4C and 4K). The optical scanning device 6 is controlled by the control section 30 to scan the peripheral surfaces of the photosensitive drums 4 (4Y, 4M, 4C and 4K) with beams B (BY, BM, BC and BK), respectively. Thereby, electrostatic latent images are formed on the peripheral surfaces of the photosensitive drums 4 (4Y, 4M, 4C and 4K).

The developing devices 7 (7Y, 7M, 7C and 7K) develop the electrostatic latent images on the photosensitive drums 4 (4Y, 4M, 4C and 4K) into toner images of Y, M, C and K, respectively. In this embodiment, all the photosensitive drums 4 have the same diameter and the same circumferential length L. However, these are not requirements. For example, the photosensitive drums 4 (4Y, 4M, 4C and 4K) may be designed such that the diameter of the photosensitive drum 4K is different from those of the other photosensitive drums 4Y, 4M and 4C while the photosensitive drums 4Y, 4M and 4C have the same diameter.

The intermediate transfer belt 11 is stretched between the driving roller 12 and the driven roller 13. The transfer devices 8 are located to face to the inner periphery of the internal transfer belt 11. The transfer devices 8 transfer toner images formed on the photosensitive drums 4 to the intermediate transfer belt 11, and the toner images transferred to the intermediate transfer belt 11 become a composite image (primary transfer). After the primary transfer, the cleaners 9 collect toner remaining on the peripheral surfaces of the photosensitive drums 4. The driving roller 12 is driven by an intermediate transfer belt driving section (not shown) to rotate, and accordingly, the intermediate transfer belt 11 rotates in a direction shown by arrow α. In this way, the intermediate transfer belt 11 carries the composite image to the secondary transfer roller 14.

The secondary transfer roller 14, which is cylindrical, is opposed to the intermediate transfer belt 11. A transfer voltage is applied to the secondary transfer roller 14, and thereby, while a sheet P is passing through between the intermediate transfer belt 11 and the secondary transfer roller 14, the composite image is transferred from the intermediate transfer belt 11 to the sheet P (secondary transfer).

The sheet P with an image transferred thereto is fed to the fixing device 20. The fixing device 20 performs a heating treatment and a pressing treatment toward the sheet P, and thereby, the image is fixed on the sheet P. The pair of ejection rollers 21 ejects the sheet P fed from the fixing device 20 onto the printed-sheet tray 23. Printed sheets P are stacked on the printed-sheet tray 23.

The sensor 18 is located to be opposed to the intermediate transfer belt at a position downstream from the photosensitive drums 4Y, 4M, 4C and 4K. The sensor 18 detects toner images transferred to the intermediate transfer belt 11. More specifically, the sensor 18 emits light to the intermediate transfer belt 11 and receives light reflected from the intermediate transfer belt 11, and the sensor 18 detects the presence or non-presence of a toner image based on the reflected light. In the following paragraphs, the position where the intermediate transfer belt 11 is irradiated with light emitted from the sensor 18 is referred to as a detecting position.

Image Stabilization Control

Figure 2:
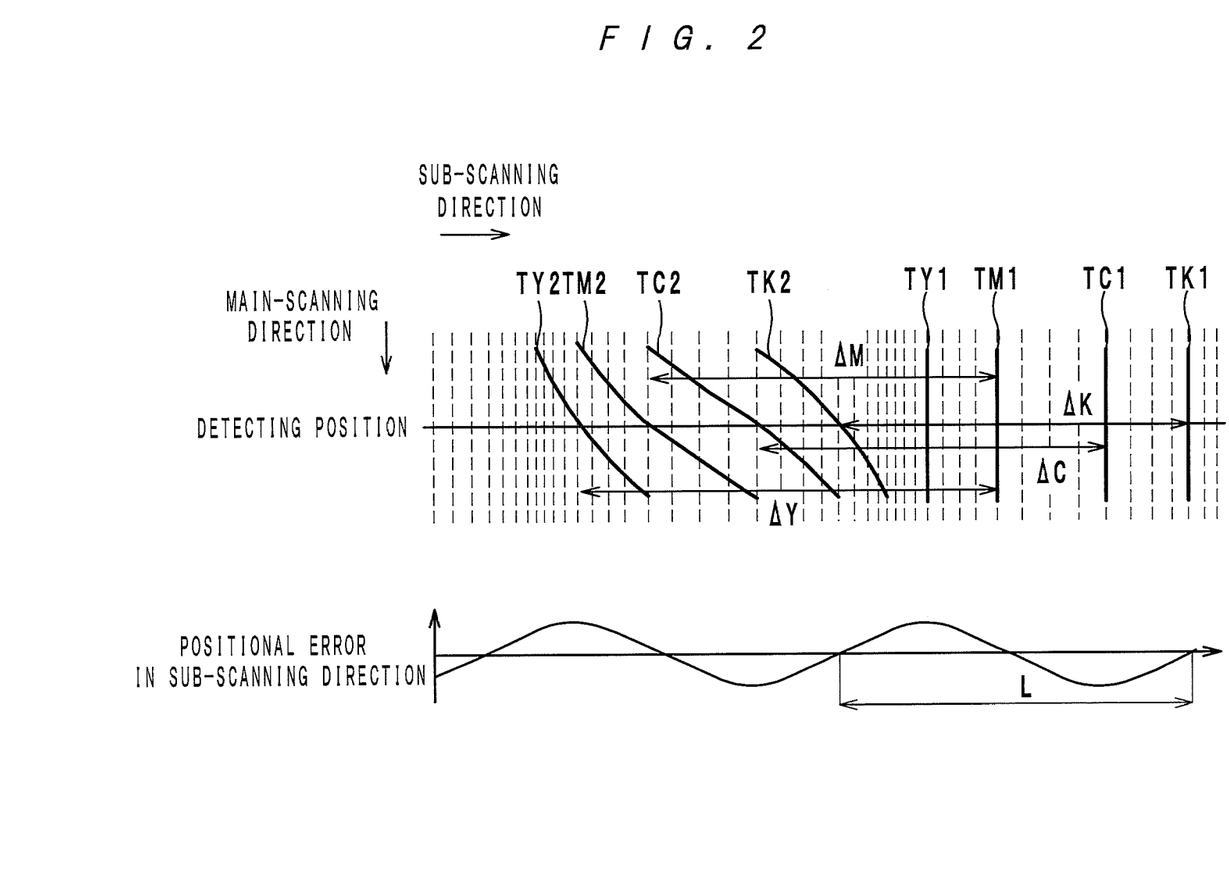
FIG. 2 is a chart showing toner patterns formed on an intermediate transfer belt in image stabilization control performed in an image forming apparatus according to an embodiment of the present invention and showing the positional errors in a sub-scanning direction of the toner patterns on the intermediate transfer belt caused by errors of photosensitive drums.

In the image forming apparatus 1, image stabilization control is performed so that toner images of Y, M, C and K can be combined together on the intermediate transfer belt 11 without registration errors. The image stabilization control is hereinafter described with reference to the drawings. FIG. 2 shows toner patterns formed on the intermediate transfer belt 11 in the image stabilization control and shows the positional errors in a sub-scanning direction of the toner patterns on the intermediate transfer belt 11 due to the eccentricity and/or the inconstant-speed rotation of the photosensitive drum 4. In the following paragraphs, the direction in which the intermediate transfer belt 11 moves is referred to as sub-scanning direction, and the direction in which the beams BY, BM, BC and BK are scanned is referred to as main-scanning direction. The main-scanning direction and the sub-scanning direction are orthogonal to each other.

In the image forming apparatus 1, as shown by FIG. 2, toner patterns TY1, TM1, TC1 and TK1, which are lines extending in the main-scanning direction, and toner patterns TY2, TM2, TC2 and TK2, which are lines slanting from the main-scanning direction, are formed. In the image forming apparatus 1, the developing devices 7Y, 7M, 7C and 7K are controlled by the control section 30 such that the toner patterns TY2, TM2, TC2 and TK2 are formed on the intermediate transfer belt 11 in positions at a distance of L (equal to the circumferential length of the photosensitive drums 4Y, 4M, 4C and 4K) on the detecting position from the toner patterns TY1, TM1, TC1 and TK1, respectively. That is, when the toner patterns TY1, TM1, TC1, TK1, TY2, TM2, TC2 and TK2 do not have positional errors in the main-scanning direction, the interval $\Delta Y$ between the toner patterns TY1 and TY2, the interval $\Delta M$ between the toner patterns TM1 and TM2, the interval $\Delta C$ between the toner patterns TC1 and TC2, and the interval $\Delta K$ between the toner patterns TK1 and TK2 on the detecting position of the intermediate transfer belt 11 are equal to the circumferential length L of the photosensitive drums 4Y, 4M 4C and 4K.

The sensor 18 detects the toner patterns TY1, TM1, TC1, TK1, TY2, TM2, TC2 and TK2, generates detection signals and sends the detection signals to the control section 30. The control section 30 calculates the intervals $\Delta Y$, $\Delta M$, $\Delta C$ and $\Delta K$ from the detection signals. Then, from the intervals $\Delta Y$, $\Delta M$, $\Delta C$ and $\Delta K$, the control section 30 calculates positional errors in the main-scanning direction of the toner patterns TY1, TM1, TC1, TK1, TY2, TM2, TC2 and TK2. Referring to FIG. 2, for example, when the toner patterns TY1 and TY2 get off to the negative side of the main-scanning direction, the interval ΔY becomes smaller than L. Accordingly, when the control section 30 calculates a value smaller than L as the interval ΔY, the control section 30 determines that the toner patterns TY1 and TY2 get off to the negative side in the main-scanning direction. On the other hand, when the toner patterns TY1 and TY2 get off to the positive side in the main-scanning direction, the interval ΔY becomes larger than L. Accordingly, when the control section 30 calculates a value larger than L as the interval ΔY, the control section 30 determines that the toner patterns TY1 and TY2 get off to the positive side in the main-scanning direction. The positional error in the main-scanning direction can be calculated, based on the difference between the calculated interval ΔY and the length L and the inclination angle of the toner pattern TY2 to the main-scanning direction. For example, when the inclination angle is 45 degrees, the positional error in the main-scanning direction is equal to the difference between the calculated interval ΔY and the length L. Then, the control section 30 controls the timing of light emission from the optical scanning device 6 on the basis of the positional errors in the main-scanning direction of the toner patterns TY1, TM1, TC1, TK1, TY2, TM2, TC2 and TK2 such that the toner images of Y, M, C and K will coincide with one another in the main-scanning direction.

Advantages

In the image forming apparatus 1 of the structure above, positional errors in the main-scanning direction of toner patterns can be detected more accurately. Generally, photosensitive drums actually do not rotate at a constant speed because the gears for rotation of the photosensitive drums have production errors. Accordingly, as shown by FIG. 6, even if the Y, M C and K test patterns, each composed of a horizontal line and a diagonal line, coincide with one another in the main-scanning direction, the intervals ΔY, ΔM, ΔC and ΔK between the respective horizontal lines and the respective diagonal lines in the Y, M, C and K test patterns depend on in what parts of the respective photosensitive drums with respect to the sub-scanning direction the Y, M, C and K test patterns were formed. This prevents accurate detection of positional errors of the Y, M, C and K test patterns in the main-scanning direction. Thus, with the image stabilization control performed in a conventional image forming apparatus, it is impossible to fully prevent color registration errors.

As shown by FIG. 2, the positional errors of toner patterns in the sub-scanning direction on the intermediate transfer belt 11 caused by the eccentricity and/or the inconstant-speed rotation of a photosensitive drum 4 are expressed as a sinusoidal wave with a period of the circumferential length L of the photosensitive drum 4. Therefore, in the image forming apparatus 1 according to this embodiment, the developing devices are controlled by the control section 30 to form the toner patterns TY2, TM2, TC2 and TK2 on the intermediate transfer belt 11 in positions at a distance of L, which is equal to the circumferential length of the photosensitive drums 4Y, 4M, 4C and 4K, on the detecting position from the toner patterns TY1, TM1, TC1 and TK1, respectively. Accordingly, when the toner patterns TY1, TM1, TC1, TK1, TY2, TM2, TC2 and TK2 do not have positional errors in the main-scanning direction, the intervals ΔY, ΔM, AC and ΔK on the detecting position are equal to the circumferential length L of the photosensitive drums 4Y, 4M, 4C and 4K. Thus, in this embodiment, the effects of the eccentricity and/or the inconstant-speed rotation of the photosensitive drums 4 on the detection of positional errors in the sub-scanning direction of the toner patterns can be eliminated. This results in an improvement in the detection accuracy of positional errors of toner patterns in the main-scanning direction.

First Modification

Figure 3:
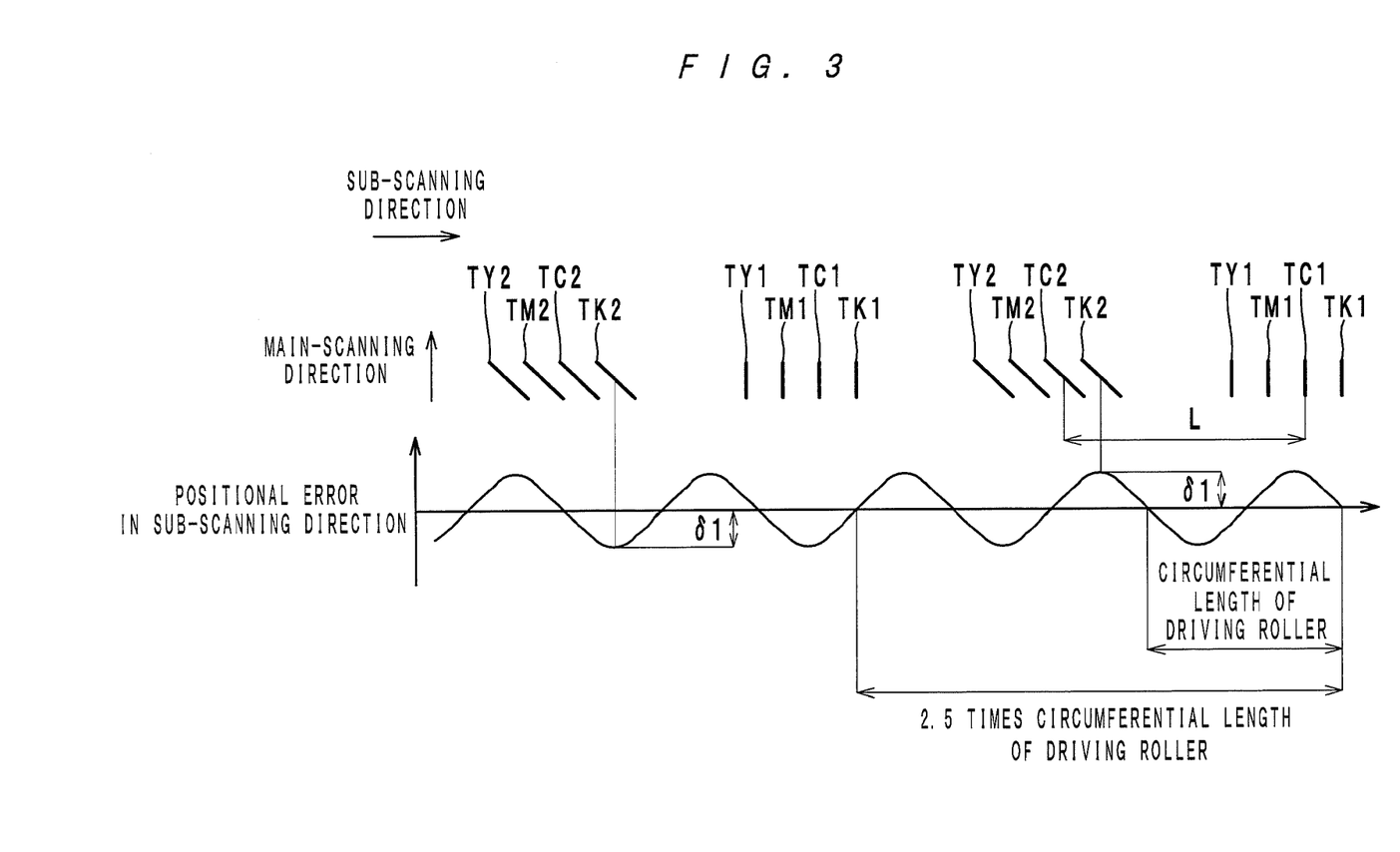
FIG. 3 is a chart showing toner patterns formed on the intermediate transfer belt in image stabilization control performed in a first modified image forming apparatus and showing the positional errors in a sub-scanning direction of the toner patterns on the intermediate transfer belt caused by errors of a driving roller.

Next, a first modified image forming apparatus 1 is described. FIG. 3 shows toner patterns formed on the intermediate transfer belt 11 in the image stabilization control performed by the first modified image forming apparatus 1 and shows the positional errors in the sub-scanning direction of toner patterns on the intermediate transfer belt 11 due to the eccentricity and/or the inconstant-speed rotation of the driving roller 12. The structure of the first modified image forming apparatus 1 is the same as that of the above-described image forming apparatus 1 and is shown by FIG. 1.

In the first modified image forming apparatus 1, the developing devices 7Y, 7M, 7C and 7K are controlled by the control section 30 to form the toner patterns TY2, TM2, TC2 and TK2 on the intermediate transfer belt 11 in positions at a distance of L (the circumferential length of the photosensitive drums 4Y, 4M, 4C and 4K) on the detecting position from the toner patterns TY1, TM1, TC1 and TK1, respectively. The operation of the control section 30 for formation of the toner patterns TY1, TM1, TC1, TK1, TY2, TM2, TC2 and TK2 in the first modified image forming apparatus 1 is the same as that in the above-described image forming apparatus 1 according to the first embodiment.

In the first modified image forming apparatus 1, 2m (m is a natural number) sets of toner patterns TY1, TM1, TC1, TK1, TY2, TM2, TC2 and TK2 are formed on the intermediate transfer belt 11. In this moment, the developing devices 7Y, 7M, 7C and 7K are controlled by the control section 30 such that the toner patterns of the same type and of the same color will be arranged on the intermediate transfer belt 11 at intervals of a length in the sub-scanning direction that is equal to n+½ (n is an integer equal to or greater than 0) times as long as the circumferential length of the driving roller 12. For example, as shown in FIG. 3, the toner pattern TK1 in the first set and the toner pattern TK1 in the second set are arranged at an interval of a length that is 2.5 times as long as the circumferential length of the driving roller 12.

Now, it is to be noted that like the photosensitive drums 4, the driving roller 12 does not rotate at a constant speed. The positional errors in the sub-scanning direction of toner patterns on the intermediate transfer belt 11 caused by the eccentricity and/or the inconstant-speed rotation of the driving roller 12 are expressed as a sinusoidal wave with a period of the circumferential length of the driving roller 12. As shown in FIG. 3, the toner pattern TK2 in the first set gets off to the positive side in the sub-scanning direction by a length δ1. If the inclination angle of the toner pattern TK2 to the main-scanning direction is 45 degrees, in this case, the interval ΔK between the toner patterns TK1 and TK2 in the first set becomes shorter than L by δ1 due to the inconstant-speed rotation of the driving roller 12.

In the first modified image forming apparatus 1, the second set of toner patterns are formed such that the toner pattern TK1 in the second set is formed at a distance of a length that is 2.5 times as long as the circumferential length of the driving roller 12 from the toner pattern TK1 in the first set. Therefore, the interval ΔK between the toner patterns TK1 and TK2 in the second set becomes longer than L by δ1 due to the inconstant-speed rotation of the driving roller 12. Thus, the error in the interval ΔK between the toner patterns TK1 and TK2 in the first set and the error in the interval ΔK between the toner patterns TK1 and TK2 in the second set are reverse to each other. The control section 30 averages the interval ΔK between the toner patterns TK1 and TK2 in the first set and the interval ΔK between the toner patterns TK1 and TK2 in the second set and determines the average value as the interval ΔK. In this way, in the first modified image forming apparatus 1, the interval ΔK can be calculated more accurately.

Although in the case of FIG. 3, the control section 30 determines the interval ΔK by using the toner patterns TK1 and TK2 in two sets, the number of sets of toner patterns TK1 and TK2 used to determine the interval ΔK may be any number that is 2m (m is a natural number). Although in the case of FIG. 3, the interval between the toner pattern TK1 in the first set and the toner pattern TK1 in the second set is 2.5 times as long as the circumferential length of the driving roller 12, the interval between the toner pattern TK1 in the first set and the toner pattern TK1 in the second set may be any length that is n+½ (n is an integer equal to or greater than 0) times as long as the circumferential length of the driving roller 12.

In the first modified image forming apparatus 1, the developing devices 7Y, 7M, 7C and 7K may be controlled by the control section 30 such that 4m (m is a natural number) sets of toner patterns TY1, TM1, TC1, TK1, TY2, TM2, TC2 and TK2 are formed. In this moment, the developing devices 7Y, 7M, 7C and 7K are controlled by the control section 30 such that the toner patterns of the same type and of the same color will be arranged on the intermediate transfer belt 11 at intervals of a length in the sub-scanning direction that is equal to n+¼ (n is an integer equal to or greater than 0) times as long as the circumferential length of the driving roller 12. For example, four sets of the toner patterns TY1, TM1, TC1, TK1, TY2, TM2, TC2 and TK2 are formed, and the toner patterns TK1 in the first set, in the second set, in the third set and in the fourth set are arranged in the sub-scanning direction at intervals of a length that is equal to 1.25 times as long as the circumferential length of the driving roller 12. Then, the error in the sub-scanning direction of the toner pattern TK1 in the first set due to the eccentricity and/or the inconstant-speed rotation of the driving roller 12 is offset with the error in the sub-scanning direction of the toner pattern TK1 in the third set due to the eccentricity and/or the inconstant-speed rotation of the driving roller 12. The error in the sub-scanning direction of the toner pattern TK1 in the second set due to the eccentricity and/or the inconstant-speed rotation of the driving roller 12 is offset with the error in the sub-scanning direction of the toner pattern TK1 in the fourth set due to the eccentricity and/or the inconstant-speed rotation of the driving roller 12. The control section 30 calculates the interval ΔK between the toner patterns TK1 and TK2 in each of the four sets and averages the calculated intervals ΔK. Then, the control section 30 determines the average value as the interval ΔK. In this way, the interval ΔK can be calculated more accurately.

Second Modification

Figure 4A:
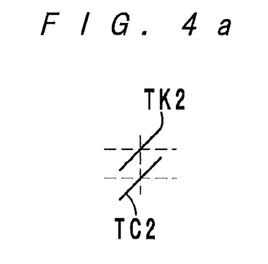
FIGS. 4a and 4b are views of toner patterns, FIG. 4a showing the toner patterns without positional errors and FIG. 4b showing the toner patterns with positional errors.
Figure 4B:
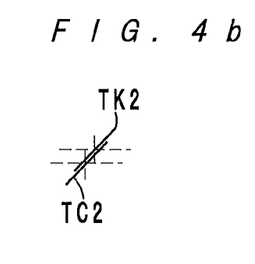
Figure 5:
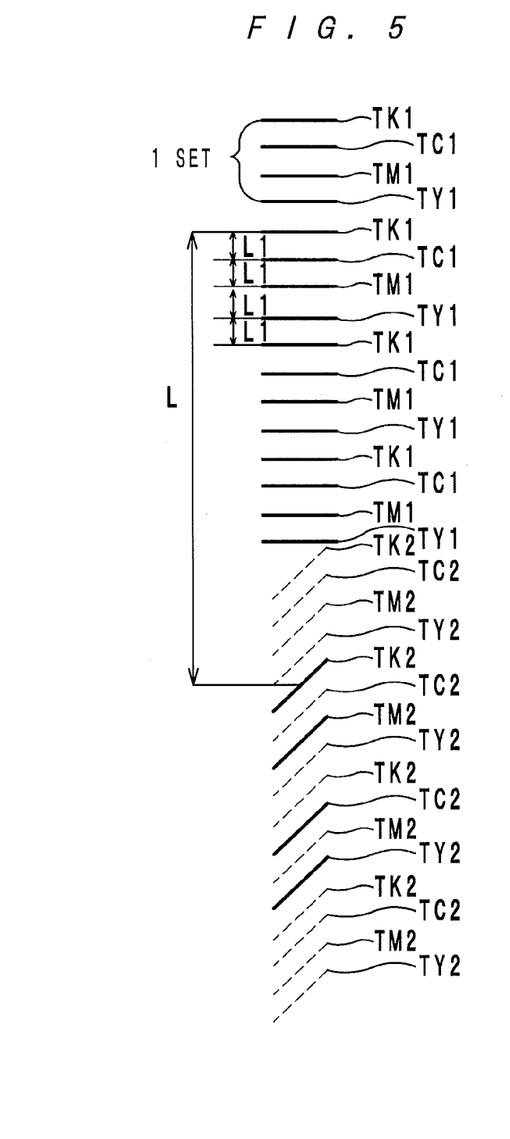
FIG. 5 is a chart of toner patterns formed on an intermediate transfer belt in image stabilization control performed in a second modified image forming apparatus.

Next, a second modified image forming apparatus 1 is described. FIGS. 4a and 4b show toner patterns when no errors occur and when errors occur, respectively, in the first modified image forming apparatus 1. FIG. 5 shows toner patterns formed in image stabilization control performed by the second modified image forming apparatus 1.

As shown by FIG. 4a, in the first modified image forming apparatus 1, toner patterns TK2 and TC2 are formed next to each other. When the toner pattern TC2 gets off to the negative side in the main-scanning direction and to the negative side in the sub-scanning direction, as shown by FIG. 4b, the toner patterns TK2 and TC2 are formed too close to each other. In this case, the sensor 18 may not be able to detect the toner patterns TK2 and TC2 separately.

In the second modification, as shown in FIG. 5, a set of toner patterns is composed of a toner pattern TY1 transferred from the photosensitive drum 4Y, a toner pattern TM1 transferred from the photosensitive drum 4M, a toner pattern TC1 transferred from the photosensitive drum 4C and a toner pattern TK1 transferred from the photosensitive drum 4K that are arranged in the sub-scanning direction. In the second modified image forming apparatus 1, the developing devices 7Y, 7M, 7C and 7K are controlled by the control section 30 such that a plurality of sets (four sets in the case of FIG. 5) of toner patterns TY1, TM1, TC1 and TK1 are arranged on the intermediate transfer belt 11 consecutively in the sub-scanning direction within a length of L. Further, the developing devices 7Y, 7M, 7C and 7K are controlled by the control section 30 to form toner patterns TY2, TM2, TC2 and TK2 such that the toner patterns TY2, TM2, TC2 and TK2 will be arranged on the intermediate transfer belt 11 at a distance of L from the toner patterns TY1, TM1, TC1 and TK1, respectively, in any of the four sets. In forming the toner patterns TY2, TM2, TC2 and TK2, the developing devices 7Y, 7M, 7C and 7K are controlled by the control section 30 to omit some of the toner patterns TY2, TM2, TC2 and TK2 such that the intervals between the toner patterns TY2, TM2, TC2 and TK2 will be greater than the intervals among the toner patterns TY1, TM1, TC1 and TK1. For example, the toner patterns TY1, TM1, TC1 and TK1 are formed at uniform intervals L1. Specifically, the intervals among the toner patterns TY1, TM1, TC1 and TK1 in one set are L1, and the interval among adjacent sets (the interval between the toner pattern TY1 and the toner pattern TK1) is also L1. In the second modified image forming apparatus 1, some of the toner patterns TY2, TM2, TC2 and TK2 are omitted such that the intervals among the toner patterns TY2, TM2, TC2 and TK2 will be greater than L1.

In other words, the toner patterns TY2, TM2, TC2 and TK2 are not formed in sets corresponding to the sets of toner patterns TY1, TM1, TC1 and TK1, and some of the toner patterns TY2, TM2, TC2 and TK2 (the toner patterns TY2, TM2, TC2 and TK2 shown by the dotted lines in FIG. 5) are omitted. Thereby, the intervals among the toner patterns TY2, TM2, TC2 and TK2 are substantially equal to or greater than twice as long as L1. Thus, the intervals among the toner patterns TY2, TM2, TC2 and TK2 in the second modified image forming apparatus 1 is greater than those in the first modified image forming apparatus 1. In the second modified image forming apparatus 1, consequently, the sensor 18 can detect adjacent toner patterns separately even if positioning errors of the toner patterns occur.

Other Embodiments

The control section 30 may calculate the errors in the sub-scanning direction of the toner patterns TY1, TM1, TC1 and TK1 from the intervals among a plurality of toner patterns TY1, the intervals among a plurality of toner patterns TM1, the intervals among a plurality of toner patterns TC1 and the intervals among a plurality of toner patterns TK1, respectively. For example, the control section 30 may calculate the error in the sub-scanning direction of the toner pattern TY1 from the interval between two toner patterns TY1.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An image forming apparatus comprising:
a plurality of photoreceptors;
a plurality of developing devices for forming toner patterns on the plurality of photoreceptors;
an intermediate transfer medium for receiving the toner patterns transferred from the plurality of photoreceptors;
a controller for controlling the plurality of developing devices to form first toner patterns that are lines extending in a main-scanning direction and second toner patterns that are lines slanting from the main-scanning direction on the plurality of photoreceptors such that the first toner pattern and the second toner pattern transferred from the same photoreceptor will be arranged on the intermediate transfer medium at an interval in a sub-scanning direction, the interval equal to a circumferential length of the photoreceptor from which the first toner pattern and the second toner pattern are transferred; and
a sensor for detecting the first toner patterns and the second toner patterns transferred onto the intermediate transfer medium.

2. An image forming apparatus according to claim 1, wherein:
the sensor detects a distance in the sub-scanning direction between the first toner pattern and the second toner pattern transferred from the same photoreceptor onto the intermediate transfer medium; and
the controller calculates a positional error in the main-scanning direction of the first toner pattern and the second toner pattern from the distance detected by the sensor.

3. An image forming apparatus according to claim 1, wherein:
the intermediate transfer medium is an intermediate transfer belt;
the image forming apparatus further comprises a driving roller for driving the intermediate transfer belt; and
the controller controls the plurality of developing devices such that 2 m first toner patterns transferred from the same photoreceptor will be arranged on the intermediate transfer medium at intervals in the sub-scanning direction of a length that is $n+\frac{1}{2}$ times as long as a circumferential length of the driving roller, wherein m is a natural number, and n is an integer equal to or greater than 0.

4. An image forming apparatus according to claim 3, wherein:
the sensor detects the intervals in the sub-scanning direction among the first toner patterns transferred from the same photoreceptor onto the intermediate transfer belt; and
the controller calculates a positional error in the sub-scanning direction of the first toner patterns from the intervals detected by the sensor.

5. An image forming apparatus according to claim 1, wherein:
the intermediate transfer medium is an intermediate transfer belt;
the image forming apparatus further comprises a driving roller for driving the intermediate transfer belt; and
the controller controls the plurality of developing devices such that 4 m first toner patterns transferred from the same photoreceptor will be arranged on the intermediate transfer medium at intervals in the sub-scanning direction of a length that is $n+\frac{1}{4}$ times as long as a circumferential length of the driving roller, wherein m is a natural number, and n is an integer equal to or greater than 0.

6. An image forming apparatus according to claim 5, wherein:
the sensor detects the intervals in the sub-scanning direction among the first toner patterns transferred from the same photoreceptor onto the intermediate transfer belt; and
the controller calculates a positional error in the sub-scanning direction of the first toner patterns from the intervals detected by the sensor.

7. An image forming apparatus according to claim 1, wherein:
the controller controls the plurality of developing devices such that a plurality of sets of first toner patterns, each set composed of one first toner pattern transferred from every one of the plurality of photoreceptors, will be arranged on the intermediate transfer medium consecutively at intervals in the sub-scanning direction; and
the controller controls the plurality of developing devices to form the second toner patterns while omitting some of the second toner patterns such that the first toner pattern in one of the sets and the second toner pattern transferred from the same photoreceptor will be arranged on the intermediate transfer medium at an interval in a sub-scanning direction of a circumferential length of the photoreceptor from which the first toner pattern and the second toner pattern are transferred, whereby the second toner patterns will be arranged on the intermediate transfer medium at intervals greater than the intervals among the first toner patterns in one set.

* * * * *